Nov. 13, 1962   W. W. OAKES   3,063,746
UNIVERSAL VACUUM CUP
Filed March 23, 1960
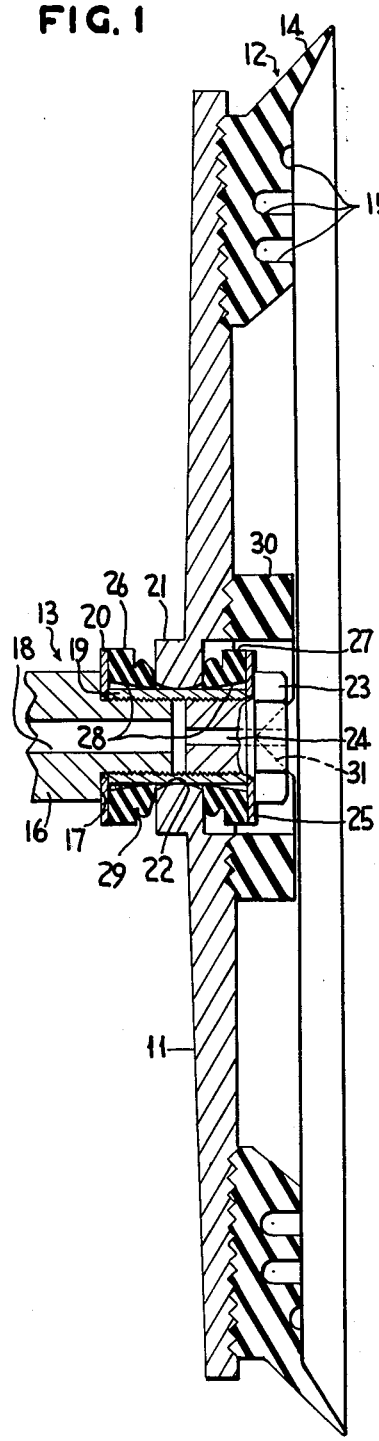
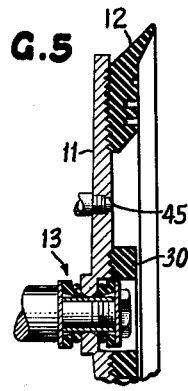
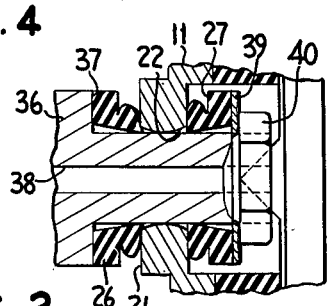
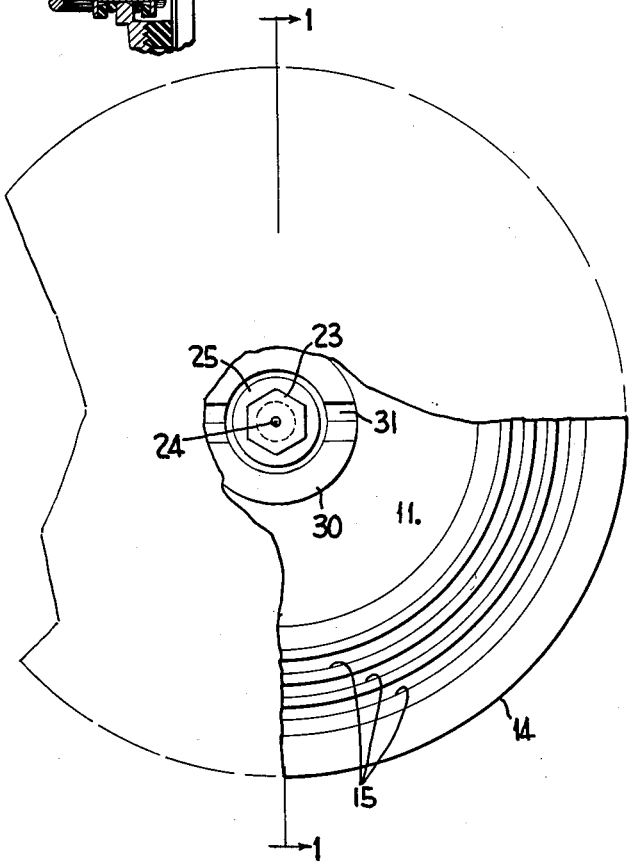
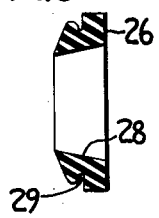
INVENTOR.
WAYNE W. OAKES
BY Oscar L. Spencer
ATTORNEY

3,063,746
UNIVERSAL VACUUM CUP
Wayne W. Oakes, Mount Vernon, Ohio, assignor to Pittsburgh Plate Glass Company, County of Allegheny, Pa., a corporation of Pennsylvania
Filed Mar. 23, 1960, Ser. No. 17,098
13 Claims. (Cl. 294—64)

This invention relates to a universal vacuum cup and more specially relates to a universal vacuum cup having a central aperture through which air is sucked from the cup.

A glass sheet or the like is lifted by engaging one of its major surfaces with one or more vacuum cups. Each of the cups is then placed in communication with a vacuum source whereby a vacuum is created within the chamber provided by the vacuum cup and sheet. So long as the vacuum is maintained, the sheet will move with the vacuum cup when the latter is moved.

A conventional vacuum cup has a handle or shaft which is connected to a circular disc on which is mounted on one side a flexible air-impervious ring or annular skirt. The disc has an aperture which is connected by a hose or pipe to a vacuum source. The aperture through the disc can extend through the shaft.

In order to lift large sheets of glass vacuum cups are mounted on a frame. The shaft of each vacuum cup is connected to the frame. It would be desirable to construct each vacuum cup so that each has a universal pivotal movement. This universal-jointed construction is especially desirable when a vacuum frame having a number of vacuum cups mounted on the frame is used to lift a curved glass sheet.

It is an object of the present invention to provide a vacuum cup having a shaft connected to the circular disc of the cup for universal-jointed movement in a fluid-tight relationship.

It is another object of this invention to provide a vacuum cup permitting a universal-jointed pivotal movement between the shaft and the circular disc of the cup while providing a centrally disposed conduit to suck air from the cup.

These and other objects of the present invention will be apparent to one skilled in the art from the following description of preferred embodiments of the cup of the invention when taken in conjunction with the drawings in which:

FIG. 1 is a cross section taken along the line 1—1 of FIG. 2;

FIG. 2 is a plan of the vacuum cup;

FIG. 3 is a cross section of one of the sealing rings of the cup;

FIG. 4 is a fragmentary cross section of an alternative embodiment taken along a line similar to that of FIG. 1 for the other embodiment; and FIG. 5 is a fragmentary cross section of an alternative embodiment taken along a line similar to that of FIG. 1.

The universal vacuum cup shown in FIGS. 1 and 2 comprises a metal or rigid circular disc 11, an annular skirt or ring generally indicated at 12 mounted on the front face of disc 11 and shaft means generally indicated at 13, which is connected to disc 11 in a manner to provide a universal joint for pivotal movement of disc 11 as described below.

The ring or skirt 12 is made of a flexible, resilient material, such as rubber, and has an outwardly extending tapered lip 14. The ring 12 has circular grooves 15 in its front face. The rear face of ring 12 has circular serrations. The front face of disc 11 has circular serrations. The ring 12 is adhered, such as by adhesive, to disc 11 with the peaks and valleys of the circular serrations of disc 11 in alignment with the circular valleys and peaks in the rear face of ring 12. The serrations increase the surface contact between disc 11 and ring 12 to enhance the adhesion.

The shaft means 13 has a handle or shaft 16 which is reduced in cross section at one end to have a shoulder 17. The shaft 16 is threaded at the reduced end. The shaft 16 has a longitudinal or axial aperture 18. An internally threaded sleeve 19 is threaded on the reduced end of shaft 16. The sleeve 19 holds a washer 20 against shoulder 17 of shaft 16.

The disc 11 has a central offset portion 21 with a central circular aperture 22. The surface of the edge of central offset portion 21 of disc 11 at aperture 22 is toroidal in shape. In other words, this edge of apertured portion 21 is a toroidal surface so that in any plane normal to disc 11 the apertured central section 21 has opposed convex surfaces. In the preferred embodiment offset portion 21 is rearwardly offset.

A screw 23 having a central longitudinal aperture 24 is threaded into the forward end of internally threaded sleeve 19. A washer 25 is mounted on the shank of screw 23.

The vacuum cup has sealing rings 26 and 27 which have the same type of construction. The rings 26 and 27 are on sleeve 19. The sealing ring 26 is compressed between washer 20 and offset portion 21 of disc 11 and sealing ring 27 is compressed between washer 25 and offset portion 21 of disc 11.

As seen more clearly in FIG. 3, each of sealing rings 26 and 27, which are made of a flexible material such as rubber, has a conical central aperture 28. The external surface of each of rings 26 and 27 has a circular groove 29. The external surface of each of rings 26 and 27 from one sidewall of groove 29 toward the smaller internal diameter end of the ring is toroidal in construction. As seen in FIG. 1, rings 26 and 27 are mounted on sleeve 19 so that their ends with the smaller diameter openings are opposing each other.

A ring 30 of rubber or other flexible material is mounted on or adhered to disc 11 concentric with ring 12. The rear face of ring 30 and the front face of disc 11 have circular serrations to provide a greater area of contact between disc 11 and ring 30. The ring 30 is present to prevent contact between a glass sheet being lifted by the vacuum cup and the head of screw 23. The front face of ring 30 is in a plane rearwardly of the front face of the main portion of ring 12. The ring 30 has radial grooves or radial V notches 31 in its front face.

The rings 26 and 27 and central portion 21 of ring 11 have dimensions relative to the length of sleeve 19 such that rings 26 and 27 are each compressed about 1/16 of an inch by screw 23 threadedly engaging sleeve 19 to place washer 25 against sleeve 19 and sealing ring 27. The diameter of the aperture in central portion 21 is slightly larger than the external diameter of sleeve 19 so that there is a slight clearance, for example, about 0.005 inch, between central portion 21 of disc 11 and sleeve 19. The diameter of the small end of conical aperture 28 of each of rings 26 and 27 is equal to the external diameter of sleeve 19. Thus rings 26 and 27 abut sleeve 19 at the smaller end of their conical apertures 28. The rings 26 and 27 are compressed against central portion 21 of disc 11. Rings 26 and 27 maintain a fluid-tight sealing engagement with central portion 21 and sleeve 19. When sleeve 19 and thus shaft 16 and screw 23 pivot relative to disc 11, sealing rings 26 and 27 maintain a fluid-tight engagement so that a vacuum can be maintained between disc 11, skirt 12 and a glass sheet.

In the construction shown in FIGS. 1 and 2 shaft means 13 includes shaft 16, washer 20 and sleeve 19. In the construction shown in FIG. 4 shaft means 13 includes a shaft 36 instead of these three components. The shaft 36 has a round end portion having a reduced diameter to provide a shoulder 37. The shaft 36 has a portion at shoulder 37 with an outer diameter about that of ring 26. The shoulder 37 provides a stop for sealing ring 26. A washer, like washer 20 in FIG. 1, is not required. The reduced end portion of shaft 36 extends through the central offset portion 21 of disc 11. The shaft 36 has a central longitudinal aperture extending through its reduced end. The reduced end portion of shaft 36 has an outer diameter that is slightly less than the diameter of circular aperture 22 in central portion 21 of disc 11. In other words the outer diameter of the reduced portion of shaft 36 is about equal to the outer diameter of sleeve 19 in the construction shown in FIGS. 1 and 2. This provides a clearance, e.g., of about 0.005 inch, between the reduced cylindrical or round end portion of shaft 36 and the central portion 21 of disc 11. The sealing rings 26 and 27 are mounted in the reduced end portion of shaft 36 on opposite sides of central offset portion 21 of disc 11. The aperture 38 extending axially through shaft 36 can be placed in communication with a vacuum source by conventional coupling of a hose to shaft 36. A washer 39 is mounted on the externally threaded reduced end portion of shaft 36. A nut 40 is on the reduced end portion of shaft 36. The nut 40 forces washer 39 against sealing ring 27. The dimensions of central portion 21 of disc 11 and sealing rings 26 and 27 are such that their sum is greater than the distance from shoulder 37 to washer 39 so that rings 26 and 27 are both compressed about 1/16 of an inch. The diameter of the smaller end of conical aperture 28 of each of rings 26 and 27 is about equal to the outer diameter of the reduced end of shaft 36. The compressed rings 26 and 27 tightly engage shaft 36 and central portion 21 of disc 11 to provide a vacuum-tight or fluid-tight relationship which is maintained during any pivotal movement of disc 11 relative to shaft 36.

Instead of central opening in the vacuum cup provided by apertures 18 and 24 in shaft 16 and screw 23, respectively, in the embodiment shown in FIGS. 1 and 2 and by aperture 38 in shaft 36 in the embodiment shown in FIG. 4, the vacuum cup may be provided with an aperture 45 in disc 11 between rings 12 and 30, as shown in FIG. 5. This aperture, instead of that in shaft 16 or shaft 36, would receive a hose connected to a vacuum source. This and other modifications of the universal vacuum cup of the present invention will be apparent to one skilled in the art from the foregoing description and from the drawings.

In the foregoing description the central portion 21 of disc 11 is offset rearwardly. It will be apparent that the invention includes a modification in which central portion 21 is offset forwardly.

The embodiments have been described solely for the purpose of illustration and not by way of limitation. The invention is limited only by the claims that follow.

I claim:
1. A universal vacuum cup comprising:
   (1) a rigid disc;
   (2) a passageway through said disc and centrally located with respect thereto, said passageway having an inner toroidal surface;
   (3) a support means, including
      (a) shaft means having
         (i) a cylindrical portion extending through the passageway of said disc, and
         (ii) a longitudinal passageway providing a conduit for fluid pressure,
      (b) sealing rings mounted on and surrounding said shaft means, at least one ring located on each side of said disc and adjacent the passageway through said disc, and
      (c) compressive means cooperating with said shaft and said rings to compress said rings against said disc to provide a pivotal and fluid-tight relationship between said shaft means and said disc; and
   (4) a ring of resilient material mounted on said disc and extending therefrom in a direction opposite from said support means to form a vacuum cup.

2. The cup of claim 1 wherein each of said sealing rings mounted on said shaft means adjacent the passageway through said disc has a conical aperture, the smaller ends of which oppose each other.

3. The cup of claim 2 wherein each of said sealing rings mounted on said shaft means has a circular groove in the outer surface of the ring and a portion of the outer surface from the groove toward the end of the ring having the smaller end of the conical aperture is toroidal.

4. A universal vacuum cup comprising:
   (1) a rigid disc;
   (2) a passageway through said disc and centrally located with respect thereto, said passageway having an inner toroidal surface;
   (3) a support means, including
      (a) shaft means having
         (i) an externally threaded cylindrical end portion extending through the passageway of said disc,
         (ii) a longitudinal passageway providing a conduit for fluid pressure,
         (iii) a washer mounted on said end portion of said shaft,
         (iv) an internally threaded sleeve mounted on said end portion of said shaft and positioning said washer,
         (v) a screw having a shank extending into and threadedly engaging said sleeve, said screw having a longitudinal passageway extending therethrough, and
         (vi) a washer mounted on said shank,
      (b) sealing rings mounted on and surrounding said sleeve, at least one ring located on each side of said disc, adjacent the passageway through said disc and compressed against said disc by said washers to provide a pivotal, fluid-tight relationship between said shaft means and said disc; and
   (4) a ring of resilient material mounted on said disc and extending therefrom in a direction opposite from said support means to form a vacuum cup.

5. The cup of claim 4 wherein each of said sealing rings mounted on said sleeve adjacent the passageway through said disc has a conical aperture, the smaller ends of which oppose each other.

6. The cup of claim 5 wherein each of said sealing rings mounted on said sleeve has a circular groove in the outer surface of the ring and a portion of the outer surface from the groove toward the end of the ring having the smaller end of the conical aperture is toroidal.

7. The cup of claim 6 wherein said cup includes a second ring of resilient material mounted on said disc and extending therefrom in a direction opposite from said support means, concentric with said screw and between said screw and said first mentioned ring mounted on said disc, said second ring having a front face in a plane forwardly of said screw and rearwardly of the first mentioned ring and having a radial groove in the front face.

8. A universal vacuum cup comprising:
   (1) a rigid disc;
   (2) a passageway through said disc and centrally located with respect thereto, said passageway having an inner toroidal surface;
   (3) a support means, including
      (a) shaft means having
         (i) a smaller diameter cylindrical end portion extending forwardly through the passageway of said disc, (ii) sealing rings mounted on and surrounding said smaller diameter end portion, at least one ring located on each side of said disc and adjacent the passageway through said disc,
(iii) a longitudinal passageway providing a conduit for fluid pressure, said longitudinal passageway being at least partially threaded,
(iv) a screw mounted on said forwardly extending cylindrical end portion, axially aligned and in threaded engagement with said longitudinal passageway,
(v) a washer mounted between said screw and the sealing ring forwardly of the disc,
(b) said shaft means, washer and screw compressing said sealing rings against said disc to provide a pivotal, fluid-tight relationship between said shaft means, and said disc; and
(4) A ring of resilient material mounted on said disc and extending therefrom in a direction opposite from said support means to form a vacuum cup.

9. The cup of claim 8 wherein each of said sealing rings mounted on said shaft means adjacent the passageway through said disc has a conical aperture, the smaller ends of which oppose each other.

10. The cup of claim 9 wherein each of said sealing rings mounted on said shaft means has a circular groove in the outer surface of the ring and a portion of the outer surface from the groove toward the end of the ring having the smaller end of the conical aperture is toroidal.

11. The cup of claim 10 wherein said cup includes a second ring of resilient material mounted on said disc and extending therefrom in a direction opposite from said support means concentric with said shaft means and between said shaft means and said first-mentioned ring mounted on said disc, said second ring having a front face in a plane forwardly of said screw and said shaft means and rearwardly of the first-mentioned ring and having a radial groove in the front face.

12. The cup of claim 1 wherein a central portion of the disc is offset from the plane of the disc in the direction of the support means and includes the passageway through the disc.

13. A universal vacuum cup comprising:
(1) a rigid disc;
(2) a passageway through said disc and centrally located with respect thereto, said passageway having an inner toroidal surface;
(3) a support means, including
 (a) shaft means having a cylindrical portion extending through the passageway of said disc,
 (b) sealing rings mounted on and surrounding said shaft means, at least one ring located on each side of said disc and adjacent the passageway through said disc,
 (c) compressive means cooperating with said shaft and said rings to compress said rings against said disc to provide a pivotal and fluid-tight relationship between said shaft means and said disc;
(4) a ring of resilient material mounted on said disc and extending therefrom in a direction opposite from said support means to form a vacuum cup; and
(5) a second passageway through said disc providing a conduit for fluid pressure.

References Cited in the file of this patent
UNITED STATES PATENTS

| | | |
|---|---|---|
| 162,010 | Bannister | Apr. 13, 1875 |
| 1,404,339 | Bockshe | Jan. 24, 1922 |
| 1,514,036 | Debaecker | Nov. 4, 1924 |
| 1,622,990 | Bonsieur | Mar. 29, 1927 |
| 2,455,650 | Billner | Dec. 7, 1948 |
| 2,721,084 | Weiss | Oct. 18, 1955 |
| 2,740,650 | Hutton | Apr. 3, 1956 |